United States Patent

Kobayashi et al.

[11] Patent Number: 6,064,414
[45] Date of Patent: May 16, 2000

[54] THERMAL TRANSFER RECORDING METHOD AND THERMAL TRANSFER PRINTER

[75] Inventors: Hiroshi Kobayashi; Shinichi Sagawai; Hirotoshi Terao; Kazuhiro Kamimura, all of Iwate-ken, Japan

[73] Assignee: Alps Electric Co., Ltd., Tokyo, Japan

[21] Appl. No.: 08/814,174

[22] Filed: Mar. 7, 1997

[30] Foreign Application Priority Data

| Mar. 15, 1996 | [JP] | Japan | 8-058838 |
| Jun. 5, 1996 | [JP] | Japan | 8-142786 |
| Sep. 30, 1996 | [JP] | Japan | 8-259871 |

[51] Int. Cl.⁷ .................................................. B41J 35/22
[52] U.S. Cl. .......................................... 347/172; 347/174
[58] Field of Search ............................. 347/172, 174, 347/176, 215, 218, 102, 105; 400/120.02, 120.04; 503/227

[56] References Cited

U.S. PATENT DOCUMENTS

| 4,250,511 | 2/1981 | Stein et al. | 347/176 |
| 4,540,991 | 9/1985 | Kariya et al. | 347/191 |
| 4,707,706 | 11/1987 | Nagano | 347/174 |
| 5,328,771 | 7/1994 | Mizobuchi | 428/483 |

FOREIGN PATENT DOCUMENTS

| 3424622 A1 | 1/1985 | European Pat. Off. |
| 0 613 783 A2 | 9/1994 | European Pat. Off. |
| 1-163077 | 6/1989 | Japan. |
| 07214804 | 8/1995 | Japan. |

*Primary Examiner*—N. Le
*Assistant Examiner*—Anh T. N. Vo
*Attorney, Agent, or Firm*—Brinks Hofer Gilson & Lione

[57] ABSTRACT

When forming an image by superimposing heat-sublimation inks of yellow, magenta and cyan and a heat-sublimation ink of black on each other, an energy to be applied to the heat-generating elements in printing with the black ink is controlled such that the print paper is not deformed thermally. Carriage travel speed in printing with the black ink is made faster than that in printing with the inks of the three colors, thereby preventing the thermal deformation of the paper from occurring. A transparent heat-melt ink is printed over an image formed with the heat-sublimation inks of the three colors, thereby maintaining the resultant print in good quality.

7 Claims, 3 Drawing Sheets

THERMAL TRANSFER RECORDING METHOD AND THERMAL TRANSFER PRINTER

BACKGROUND OF THE INVENTION

1. Field of the Invention

The present invention relates to a thermal transfer recording method in which the heat-generating elements of a thermal head are selectively heated to transfer the ink on an ink film to a sheet of print paper for recording and a thermal transfer printer based on the method and, and more particularly, to the improvements in a thermal transfer recording method capable of recording on dedicated print paper a color image of high picture quality comparable to a silver salt photograph and a thermal transfer printer based on this method.

2. Description of the Related Art

In prior-art thermal transfer printers in general, a sheet of print paper is held in front of a platen, a thermal head formed with a plurality of heat-generating elements is mounted on a carriage, an ink film with ink applied to the base, for example, an ink ribbon, and the print paper are held between the thermal head and the platen, the ink ribbon is fed while the thermal head is being reciprocated on the carriage along the platen, the heat-generating elements on the thermal head are selectively supplied with an electric current according to recording information, and the ink on the ink ribbon is partially transferred by the heat generated on the selected heat-generating element onto the paper for recording desired images such as characters. Such thermal transfer printers are often used as output devices of computers and dedicated wordprocessors for their high recording picture quality, low noise, low cost, and ease of maintenance.

One of well-known conventional thermal transfer printers uses an ink ribbon with a heat-melt ink applied to the base such as a plastic film (this ribbon is referred to as a heat-melt ink ribbon) for recording, while another uses an ink ribbon with a heat-sublimation ink applied to the base (this ribbon is referred to as a heat-sublimation ink ribbon) for recording.

The thermal transfer printer that uses the heat-melt ink ribbon (hereinafter referred to as a heat-melt type printer) is mainly used to print on a wide variety of papers such as plain paper, thick paper, and postcard, and excellent in use. For gray-scale image printing with the heat-melt ink ribbon, dither process is used because gray-scale control on a dot basis is disabled with this type of printer.

On the other hand, the thermal transfer printer that uses the heat-sublimation ink ribbon (hereinafter referred to as a heat-sublimation type printer) can adjust the sublimation quantity of the heat-sublimation ink to control the ink quantity to be transferred to the paper by regulating the energy to be applied to the thermal head for heating the same. Therefore, the printer of this type can provide full-color recording image printing comparable in quality to silver salt photography if a dedicated surface-processed print paper is used. For this merit, the heat-sublimation type printer has recently come to be widely used as a video printer of high picture quality for example.

A thermal transfer printer that can use the ink ribbons of both types has been developed. A full-color recording printer implements full-color printing by combinations of three colors of yellow, magenta and cyan, or combinations of four colors of yellow, magenta, cyan and black. Generally, for the heat-sublimation type printer to provide a high-density recording image, a higher energy is required for driving the heat-generating elements of the thermal head than on the heat-melt type printer.

In the above-mentioned heat-sublimation type printer, printing an image composed of two colors or less by applying a large amount of energy to the heat-generating elements of the thermal head does not adversely affect the print paper, providing good printing. However, printing a high-density gray recording image with the above-mentioned three or four colors by applying the same amount of energy thermally deforms the print paper to cause a so-called matting phenomenon such as wrinkle or wave, failing to provide good-quality printing. The print paper is thermally deformed by a total accumulated energy given from the heat-generating elements every time the ink of a single color is applied to the paper, exceeding a threshold of paper thermal deformation.

In the above-mentioned conventional thermal transfer printers, printing with a heat-sublimation ink ribbon may cause discoloration of the print due to ultraviolet ray and so on if the print is left in the open air for long because the dye used in the ink is low in weatherability, and peeling-off of the transferred ink when it is scratched, making it difficult to maintain print quality over a long period of time.

SUMMARY OF THE INVENTION

It is therefore an object of the present invention to provide a thermal transfer recording method in which printing with heat-sublimation ink ribbons of three colors (yellow, magenta and cyan) will not adversely affect the print paper to ensure printing of good quality, and a thermal transfer printer based on this method.

Another object of the present invention is to provide a thermal transfer recording method in which, when forming a color image by superimposing heat-sublimation inks of three colors, if this color image has a density higher than a predetermined density, printing with a black ink or a transparent ink is further performed and an energy applied to the heat-generating elements in this printing is made lower than that applied to the heat-generating elements in the printing with each of yellow, magenta and cyan inks; or the carriage moving speed at printing with the black ink or the transparent ink is made faster than that at printing with each of the yellow, magenta and cyan inks.

Still another object of the present invention is to provide a thermal transfer printer having a controller by which the energy to be applied to the heat-generating elements is controlled to adjust the sublimation amount of a sublimation ink according to the density of an image to be printed; and when forming a color image by superimposing the sublimation inks of three colors, if the color image has a density higher than a predetermined density, printing with a black ink or a transparent ink is further performed and an energy applied to the heat-generating elements in this printing is made lower than that applied to the heat-generating elements in the printing with each of yellow, magenta and cyan inks, and to provide a further thermal transfer printer having a controller by which the carriage moving speed at printing with the black ink or the transparent ink is made faster than that at printing with each of the yellow, magenta and cyan inks.

Yet another object of the present invention is to provide a thermal transfer recording method in which, if a heat-sublimation ink ribbon is used, discoloration of the print due to ultraviolet ray or other causes and ink peeling-off are surely prevented from occurring to maintain print quality for long.

The above and other objects, features and advantages of the present invention will become more apparent from the accompanying drawings, in which like reference numerals are used to identify the same or similar parts in several views.

DETAILED DESCRIPTION OF THE PREFERRED EMBODIMENTS

This invention will be described in further detail by way of example with reference to the accompanying drawings. First, a first embodiment of the present invention will be described.

Figure 1:
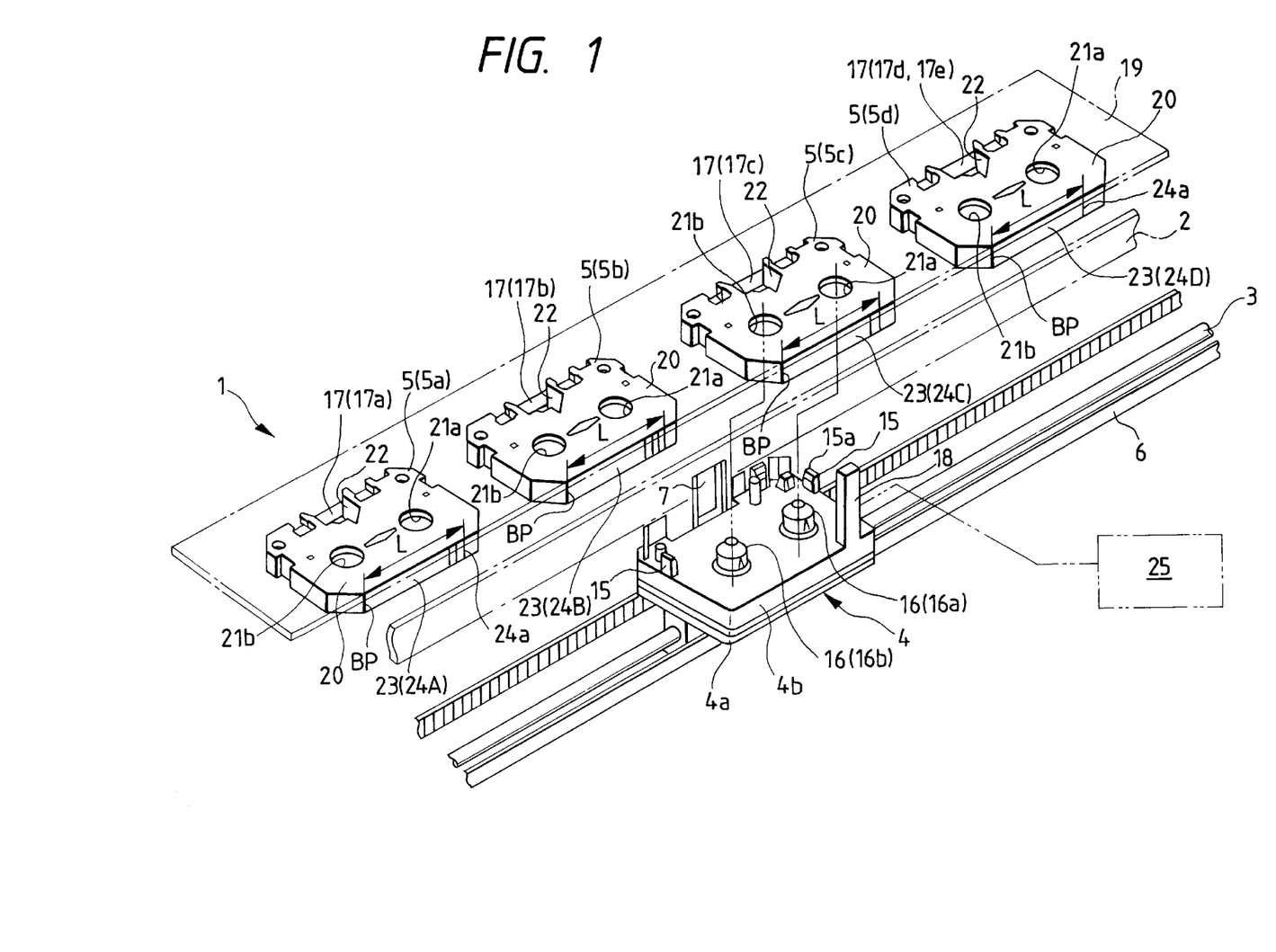
FIG. 1 is a perspective view illustrating a constitution of the main portion of a thermal transfer printer practiced as one preferred embodiment of the present invention.

Referring to FIG. 1, a thermal transfer printer 1 has a platen 2 having the shape of a flat plate, arranged at a desired position, the recording surface of the platen being oriented generally vertically. In a lower front side of the platen 2, a guide shaft 3 is arranged in parallel to the platen 2. The guide shaft 3 is mounted with a carriage 4 which is divided into an upper portion and a lower portion. The lower portion is a lower carriage 4a mounted on the guide shaft 3. The upper portion is an upper carriage 4b which is accessible, in vertical direction, to the lower carriage 4a mounted with a ribbon cassette 5 to be described later. The carriage 4 is reciprocated along the guide shaft 3 by driving a drive belt 6 wound around a pair of pulleys, not shown, with an appropriate driving device such as a stepper motor, not shown.

The carriage 4 is arranged with a thermal head 7 opposite and accessible to the platen 2 to make recording on a sheet of paper, not shown, held on the platen 2 when the thermal head 7 is pressed against the platen. This paper is a dedicated paper on which surface processing is performed such that a heat-sublimation ink is fixed with stability. The thermal head 7 is provided with a plurality of heat-generating elements, not shown, arranged in an array to be selectively energized based on desired recording information supplied via a host computer, an image reader, a keyboard or the like information input device, not shown.

Figure 3:
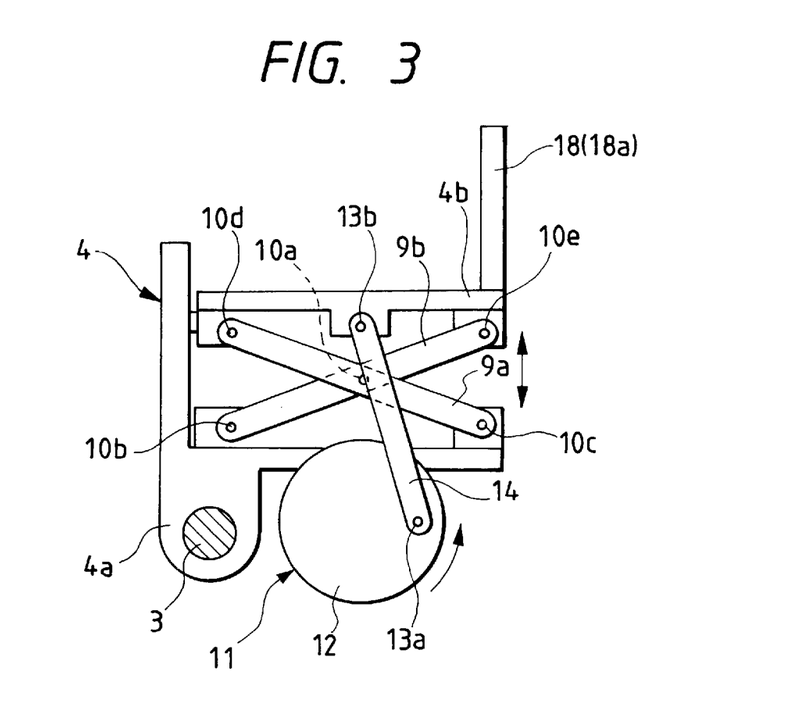
FIG. 3 is a schematic side view illustrating the carriage of the embodiment of FIG. 1.

To be more specific, the carriage 4 has the plate-like upper carriage 4b on top of the lower carriage 4a generally in parallel, the lower carriage 4a being mounted on the guide shaft 3. As shown in FIG. 3, the upper carriage 4b is mounted on the lower carriage 4b in a parallel movable manner such that the upper carriage 4b accesses the lower carriage 4a by a pair of parallel cranks 8 arranged on the left and right sides of the carriage 4. Each of the pair of parallel cranks 8 has a pair of links 9a and 9b which cross each other generally in the state of "X". The links 9a and 9b are pivoted to each other at the cross section thereof with a pin 10a. The links 9a and 9b are slidably engaged at the ends thereof with slits, not shown, formed in the ends of the left and right sides of the lower carriage 4a and the upper carriage 4b, with pins 10b, 10c, 10d and 10e respectively.

The lower carriage 4a is also arranged with a rotary crank 11 by which the upper carriage 4b is moved in parallel. The rotary crank 11 is composed of a rotary disk 12 supported by the lower carriage 4a for rotary drive and a connection link 14 pivoted at one end thereof to the rotary disk 12 at an eccentric position thereof with a pin 13a. The other end of the connection link 14 is pivoted to the upper carriage 4b with a pin 13b. The rotary disk 12 is rotatably driven by an appropriate actuator such as a motor, not shown.

Referring to FIG. 1 again, on the left and right sides of the upper carriage 4b, plate-like arms 15 are disposed in a standing manner with a space therebetween generally equal to the width of the ribbon cassette 5. Each arm 15 has an engaging portion 15a at its top end being gradually bent inward. At the center portion of the upper carriage 4b, a pair of rotary bobbins 16 are arranged in a projecting manner with a predetermined interval therebetween. The pair of bobbins 16 allow an ink ribbon 17 to travel in a predetermined direction. One of the bobbins 16 is a take-up bobbin 16a for winding the ink ribbon 17, while the other is a supply bobbin 16b for supplying the ink ribbon 17. An optical sensor 18 (18a) for detecting the type of the ink ribbon 17 accommodated in the ribbon cassette 5 is disposed on the carriage 4 at its edge away from the platen 2.

The optical sensor 18a is connected to a controller 25 disposed at a desired position of the thermal transfer printer 1 for controlling the recording operation and other operations thereof. The controller 25 is composed of a memory, a CPU, and other components, not shown. Based on a signal outputted from the optical sensor 18a while the carriage 4 is moving, the controller 25 at least determines or detects presence or absence of the ribbon cassette 5, the type of the ink ribbon 17 accommodated in the ribbon cassette 5, the travel distance of the carriage 4 relative to its home position, the open or close state of a canopy 19 to be described later, and the distance between the pair of adjacent or separated ribbon cassettes 5.

Figure 2:
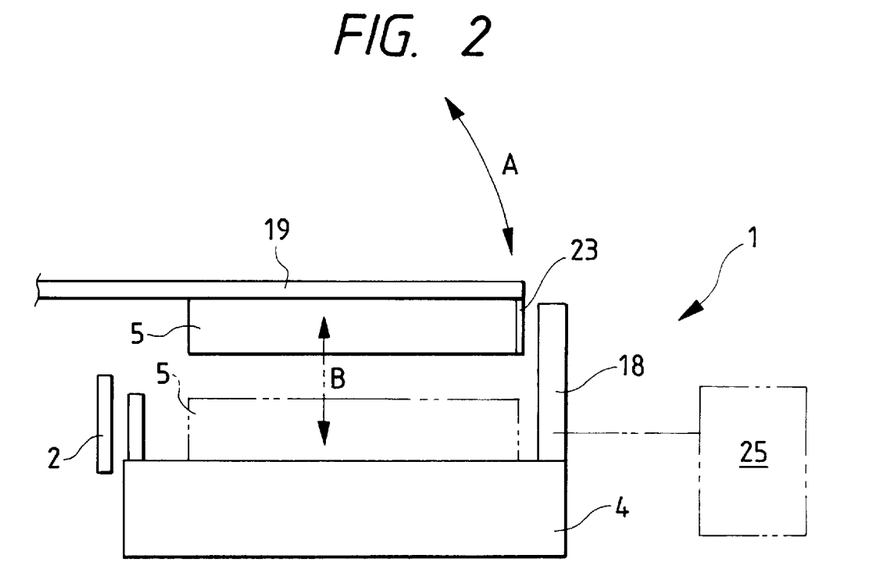
FIG. 2 is a schematic side view illustrating the main portion of the embodiment of FIG. 1.

As shown in FIGS. 1 and 2, the generally plate-like canopy 19 is arranged over the carriage 4 appropriately spaced therefrom on a frame, not shown, such that the canopy can be opened and closed in the directions indicated by arrow A of FIG. 2. In the closed state, the canopy 19 serves to hold down the paper at the exit of a paper feed mechanism, not shown. The canopy 19 has a length, along the carriage 4, generally equivalent to the travel area of the carriage 4.

A plurality of cassette holders, not shown, for holding the ribbon cassettes 5 are disposed at predetermined positions on the canopy 19 at the side opposed to the carriage 4. By these cassette holders, the ribbon cassettes 5a, 5b, 5c and 5d housing heat-sublimation ink ribbons 17a, 17b, 17c and 17d respectively of four colors for color image printing are arranged in a row along the travel direction of the carriage 4. To be specific, the ribbon cassette 5a houses the ink ribbon 17a containing a yellow heat-sublimation ink, the ribbon cassette 5b houses the ink ribbon 17b containing a magenta heat-sublimation ink, the ribbon cassette 5c houses the ink ribbon 17c containing a cyan heat-sublimation ink, and the ribbon cassette 5d houses the ink ribbon 17d containing a black heat-sublimation ink.

These ribbon cassettes 5a, 5b, 5c and 5d are selectively passed between the canopy 19 and the carriage 4b in the directions indicated arrow B of FIG. 2.

The ribbon cassettes 5a, 5b, 5c and 5d used in the present embodiment are the same in shape and dimensions regardless of the types of the ink ribbons 17. Each of the ribbon cassettes is composed of a generally flat and rectangular case body 20 made of upper and lower members in which a pair of rotatably supported reels 21, a pair of rotatably supported ribbon feed rollers, not shown, and a plurality of rotatably supported guide rollers facing a ribbon path are disposed. The ink ribbon 17 is wound between the pair of reels 21. The middle of the ribbon path for the ink ribbon 17 is drawn outside. The pair of reels 21, when mounted on the upper carriage 4b, provide the take-up reel for winding the ink ribbon used for printing and the supply reel for feeding the ink ribbon 17. A plurality of key grooves are formed on the inner periphery surface of each reel 21 in a manner of spline spaced from each other around the periphery. The inner periphery surface of one reel 21 provides a take-up hole 21a in which the take-up bobbin 16a is engaged. The inner periphery surface of the other reel 21 provides a supply hole 21b in which the supply bobbin 16b is engaged. On the surface of the ribbon cassette 5 opposed to the platen 2 when the ribbon cassette is mounted on the carriage 4, a recess 22 is formed to which the thermal head 7 faces. In this recess 22, the middle of the ink ribbon 17 is drawn.

On the rear side of the ribbon cassette 5 running in parallel to the side on which the recess 22 is formed, an identification marker 23 is disposed for identifying the type of the ink ribbon 17 housed in each ribbon cassette 5. The identification marker 23 used in the present embodiment is formed by a reflective seal 24 having a plurality of stripe-like nonreflective portions 24a of which number corresponds to the types of the ink ribbons 17.

The identification marker 23 is detected by the optical sensor 18a mounted on the carriage 4. A resultant detection signal is inputted in the controller 25 of the printer 1. Based on the inputted signal, the controller 25 counts the number of nonreflective portions on each ribbon cassette 5 to determine the type of the ink ribbon 17 housed in each ribbon cassette 5.

To be more specific, the ribbon cassette 5a shown at the left end of FIG. 1 has, as the identification marker 23, a reflective seal 24A having three nonreflective portions 24a. The ribbon cassette 5b has, as the identification marker 23, a reflective seal 24B having four nonreflective portions 24a. The ribbon cassette 5c has, as the identification marker 23, a reflective seal 24C having two nonreflective portions 24a. The ribbon cassette 5d has, as the identification marker 23, a reflective seal 24D having one nonreflective portion 24a. The left end of the rear side of the ribbon cassette 5 provides a base position BP for detecting the identification marker 23. Distance L between the base position BP and the right end of the nonreflective portion 24a located at the right end in the figure is the same with all identification markers 23. The nonreflective portions 24a is disposed inside this distance L. With the identification marker 23 detected by the optical sensor 18a, the carriage 4 is in the stopped state. With the carriage 4 in the stopped state, the ribbon cassette 5 housed in the cassette holder on the canopy 19 is passed to the upper carriage 4b.

Figure 4:
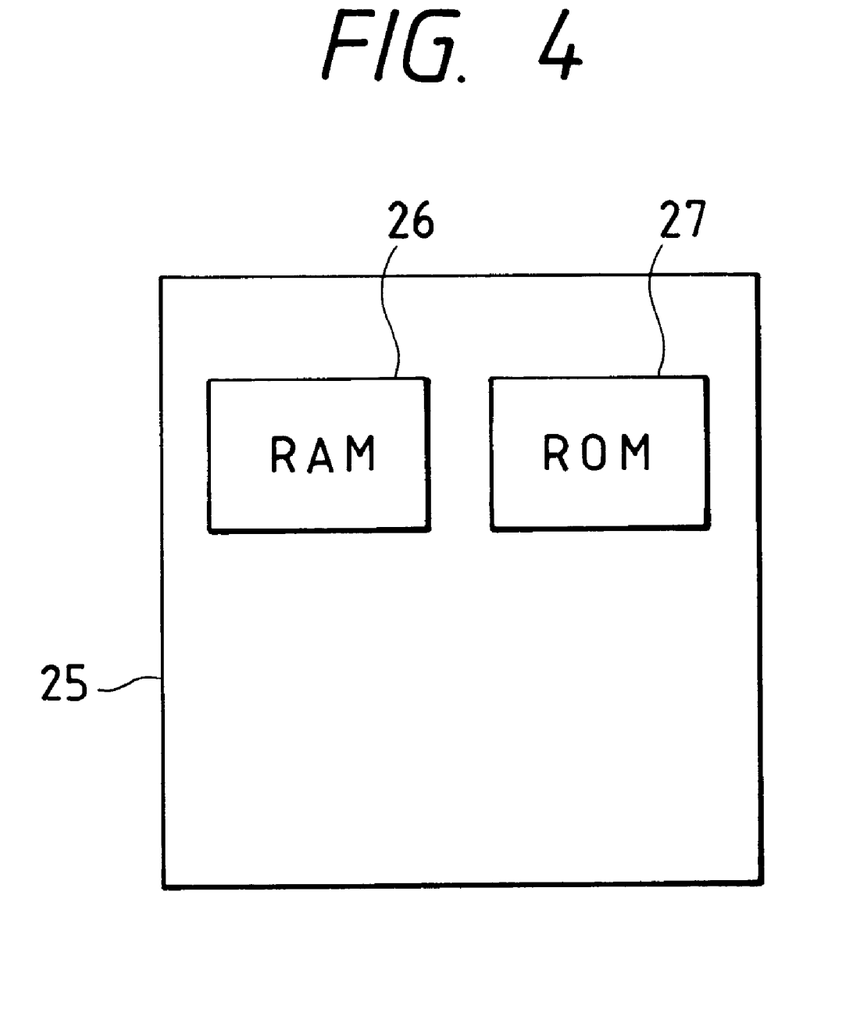
FIG. 4 is a block diagram illustrating the outline of the controller of the embodiment of FIG. 1.

Now, referring to FIG. 4, the controller 25 has a RAM (Random Access Memory) 26 and a ROM (Read Only Memory) 27. The RAM 26 stores image information for recording, which is divided into identification data of four colors of yellow, magenta, cyan and black. The color recording data corresponding to the color of the ink ribbon 17 housed in the ribbon cassette 5 to be used for actual printing is read from the RAM 26 into the controller 25. Based on this data, the controller 25 selectively drives the plurality of heat-generating elements of the thermal head 7.

Meanwhile, printing of an ordinary color image is performed by superimposing heat-sublimation inks of two colors or less. To print black and high-density gray images, heat-sublimation inks of three colors of yellow, magenta and cyan or four colors of yellow, magenta, cyan and black must be superimposed. As described earlier, in the heat-sublimation type printer, printing a color image by superimposing inks of two colors or less will not adversely affect the paper if a large amount of energy is applied in the printing to the heat-generating elements of the thermal head 7, providing good printing. However, printing a color image by superimposing inks of three or four colors by application of the same amount of energy deforms the paper thermally, causing a so-called matting phenomenon such as wrinkle or wave, resulting in poor printing. This is because a large amount of energy is applied to the paper.

To solve this problem, the above-mentioned embodiment controls the amount of energy to be applied to the heat-generating elements of the thermal head 7 by the controller 25 according to the density of an image to be printed.

Table 1 shows a relationship between the energies to be applied to the heat-generating elements and the matting phenomenon in printing with four colors in 16 gray scales. The vertical axis indicates the energies to be applied to the heat-generating elements in printing in each of yellow, magenta and cyan. The horizontal axis indicates the energies in printing in black. As the number increases, the energies get higher. Each number indicates a relative amount of applied energy in representing the density in 16 steps. A circle (○) at the intersection of the vertical and horizontal axes indicates that, at that combination of energies, no matting phenomenon occurs, while a cross (x) indicates that, at that combination of energies, a matting phenomenon occurs.

TABLE 1

APPLIED ENERGIES FOR RECORDING YELLOW, MAGENTA AND CYAN INKS

| | | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| APPLIED | 0 | ○ | ○ | ○ | ○ | ○ | ○ | ○ | ○ | ○ | ○ | ○ | X | X | X | X | X |
| ENERGIES | 1 | ○ | ○ | ○ | ○ | ○ | ○ | ○ | ○ | ○ | ○ | ○ | X | X | X | X | X |
| FOR | 2 | ○ | ○ | ○ | ○ | ○ | ○ | ○ | ○ | ○ | ○ | ○ | ○ | ○ | ○ | ○ | ○ |
| RECORDING | 3 | ○ | ○ | ○ | ○ | ○ | ○ | ○ | ○ | ○ | ○ | ○ | ○ | ○ | ○ | ○ | ○ |
| BLACK INK | 4 | ○ | ○ | ○ | ○ | ○ | ○ | ○ | ○ | ○ | ○ | ○ | ○ | ○ | ○ | ○ | ○ |
| | 5 | ○ | ○ | ○ | ○ | ○ | ○ | ○ | ○ | ○ | ○ | ○ | ○ | ○ | ○ | ○ | ○ |
| | 6 | ○ | ○ | ○ | ○ | ○ | ○ | ○ | ○ | ○ | ○ | ○ | ○ | ○ | ○ | ○ | ○ |
| | 7 | ○ | ○ | ○ | ○ | ○ | ○ | ○ | ○ | ○ | ○ | ○ | ○ | ○ | ○ | ○ | ○ |
| | 8 | ○ | ○ | ○ | ○ | ○ | ○ | ○ | ○ | ○ | ○ | ○ | ○ | ○ | ○ | ○ | ○ |
| | 9 | ○ | ○ | ○ | ○ | ○ | ○ | ○ | ○ | ○ | ○ | ○ | ○ | ○ | ○ | ○ | ○ |

TABLE 1-continued

APPLIED ENERGIES FOR RECORDING YELLOW, MAGENTA AND CYAN INKS

|    | 0 | 1 | 2 | 3 | 4 | 5 | 6 | 7 | 8 | 9 | 10 | 11 | 12 | 13 | 14 | 15 |
|----|---|---|---|---|---|---|---|---|---|---|----|----|----|----|----|----|
| 10 | O | O | O | O | O | O | O | O | O | O | O  | O  | O  | O  | O  | O  |
| 11 | O | O | O | O | O | O | O | O | O | O | O  | X  | X  | X  | X  | X  |
| 12 | O | O | O | O | O | O | O | O | O | O | O  | X  | X  | X  | X  | X  |
| 13 | O | O | O | O | O | O | O | O | O | O | O  | X  | X  | X  | X  | X  |
| 14 | O | O | O | O | O | O | O | O | O | O | O  | X  | X  | X  | X  | X  |
| 15 | O | O | O | O | O | O | O | O | O | O | O  | X  | X  | X  | X  | X  |

As seen from this table, a matting phenomenon occurs if the amount of applied energy in printing in black is 0 and the amount of applied energy for printing in each of yellow, magenta and cyan is 11 or higher when forming an image by superimposing inks of three colors or less. However, even in forming an image by superimposing inks of four colors, if the applied energy in printing in black is between 2 and 10 inclusive, no matting phenomenon occurs. Also, if the applied energy is 10 lower in printing in each of yellow, magenta and cyan, no matting phenomenon occurs even if the applied energy in printing in black is 15, the maximum value.

The reasons are as follows. When the applied energy in printing in black is between 2 and 10 inclusive, if a matting phenomenon is caused by superimposing inks of three colors, heating of the paper caused by the later superimposing of a black ink causes a laminate effect, which smoothes the wavy surface of the paper. When the applied energy in printing in each of yellow, magenta and cyan is 10 or lower, the total energy obtained by adding the energies accumulated so far to the applied energy in printing in black is less than the amount of energy that causes a matting phenomenon.

Therefore, in the present embodiment, the applied energy in printing in black in forming an image by superimposing inks of four colors is set to the minimum of 2 and the maximum of 10.

The following describes the operation of the first embodiment having the above-mentioned constitution.

Image information inputted from a host computer or an image reader, not shown, into the controller 25 of the thermal transfer printer 1 of the present embodiment is stored in the RAM 26 as recording data classified by four colors of yellow, magenta, cyan and black. Actual printing is performed in the order of yellow, magenta, cyan and black by using the ribbon cassettes 5a, 5b, 5c and 5d in this order. It should be noted that a chromatic color is formed by adding a gray scale to one or two of inks of three colors of yellow, magenta and cyan. An achromatic color is formed by adding a gray scale to a combination of inks of three colors of yellow, magenta and cyan. Of achromatic colors, specially high density black, or great black is formed by adding a black ink to the three inks of yellow, magenta and cyan.

Printing in the yellow ink is performed as follows. The cassette ribbon 5a housing the yellow heat-sublimation ink ribbon 17a is detected when the optical sensor 18a arranged on the carriage 4 detects the identification marker 23 of the ribbon cassette 5a while the carriage 4 is being moved from the home position to the right by a command given by the controller 25. Then, upon detecting the identification marker, the optical sensor 18a sends a detection signal indicating the identification marker 23 containing the arrangement and pitch of the nonreflective portions 24a to the controller 25. The controller 25 determines whether the detected identification marker 23 is of the ribbon cassette 5a corresponding to the command. If the identification marker 23 is found of the ribbon cassette 5a corresponding to the command, the controller 25 stops the carriage 4; otherwise, the controller 25 continues moving the carriage 4 until the identification marker 23 of the ribbon cassette 5a corresponding to the command is found.

If the desired identification marker 23 is found, the controller 25 stops the carriage 4 at a position opposed to the corresponding ribbon cassette 5a, drives each parallel crank 8 and the rotary crank 11 to raise the upper carriage 4b, and passes the ribbon cassette 5a held in the cassette holder of the canopy 19 and housing the yellow heat-sublimation ink ribbon 17a to the upper carriage 4b. Then, the controller 25 drives each parallel crank 8 and the rotary crank 11 again to lower the upper carriage 4b until the same touches the lower carriage 4a, upon which yellow printing using this ribbon cassette 5a starts. In this yellow printing, the controller 25 performs control such that the printing is performed according to the density of the recording image to be printed. As a result, the yellow printing is performed by one of the applied energies up to the maximum of 15 in Table 1.

When the yellow printing is completed, the controller 25 stops the carriage 4 at a position opposed to the cassette holder that housed the ribbon cassette 5a used in the printing, raises the upper carriage 4b as described above, and passes the yellow ink ribbon cassette 5a mounted on the upper carriage 4b to the cassette holder. Then, the optical sensor 18a detects the identification marker 23 of the magenta ribbon cassette 5b to be used next. The corresponding ribbon cassette 5b is mounted on the carriage 4, upon which magenta printing is performed. In this magenta printing too, the controller 25 performs control such that the printing is performed according to the density of the recording image to be printed. As a result, the magenta printing is performed by one of the applied energies up to the maximum of 15 in Table 1.

When this magenta printing is completed, cyan printing is performed in generally the same manner by one of the applied energies up to the maximum of 15 in Table 1.

Thus, the printing by use of the yellow, magenta and cyan heat-sublimation inks is performed according to the density of the image to be printed by the applied energies selected from the applied energies up to the maximum of 15 in Table 1.

If recording data indicating the use of a black ink is outputted from the RAM 26 of the controller 25 to the controller 25 after completion of the printing of the three colors, an image formed by superimposing the four colors is provided. Therefore, the controller 25 performs control such that black printing is performed by an applied energy of the maximum of 10 in Table 1 if each of the energies applied to the heat-generating elements for printing yellow, magenta and cyan exceeds 11. In the state before performing the printing with the black ink, the energies applied to the heat-generating elements exceeded 11 in high density in printing with the yellow, magenta and cyan inks, causing a matting phenomenon on the paper. The laminate effect caused by the heating for superimposing the black ink smoothes the waviness of the paper, eliminating the matting phenomenon. It should be noted that, in forming an achromatic image such as black or gray, the energies to be applied to the heat-generating elements when printing with yellow, magenta and cyan inks are normally made equal to each other.

On the other hand, upon completion of the recording with the three colors if the energies applied to the heat-generating elements when printing with yellow, magenta and cyan inks before the recording data indicating black printing is outputted from the RAM 26 of the controller 25 to the controller 25 are 10 or less of low density, application of the energy for the black printing poses no danger of causing a matting phenomenon. Therefore, the black printing can be performed by using the maximum energy of 15. However, superimposing high-density black fails to form the gray image of a desired density, so that the applied energy of 10 or less is also used for the black printing. It should also be noted that forming such a high-density gray image need not superimpose a black ink.

As described, according to the thermal transfer printer practiced as the above-mentioned embodiment, when forming a high-density gray or black image by superimposing the heat-sublimation inks of four colors, the energy to be applied to the heat-generating elements for the last black printing is made lower than those to be applied when printing with the other three color inks. Therefore, if the print paper is affected by a matting phenomenon by the energies applied to the heat-generating elements for printing with yellow, magenta and cyan inks, the laminate effect caused by the heating of the paper in printing with the black ink eliminates the matting phenomenon, resulting in the smoothed paper for good-quality printing.

It will be apparent that the present invention is not limited to the above-mentioned embodiment and changes and modifications may be made without departing the spirit of the invention. For example, in the above-mentioned embodiment, an energy of 10 to be applied to the heat-generating elements is used only when printing with a black heat-sublimation ink for forming a high-density gray or black image by superimposing the heat-sublimation inks of the four colors; it will be apparent that, if the desired energy is found between 2 and 10 inclusive, a matting phenomenon can be eliminated.

The following describes a second preferred embodiment of the present invention.

The basic constitution of the second embodiment is generally the same as that of the above-described first embodiment; therefore the description of the basic constitution will be omitted from the following description. In the second embodiment, when forming a gray or black image by superimposing heat-sublimation inks of the four colors, the travel speed of the carriage 4 at which printing with the black heat-sublimation ink is performed is made higher than that at which printing with each of yellow, magenta and cyan inks is performed, thereby making smaller the energy to be applied to the thermal head 7 for the black printing than that for printing in the other three colors to prevent the paper from being deformed thermally. To achieve this objective, the number of rotations of a drive device such as a stepping motor, not shown, for reciprocating the carriage 4 is controlled by the controller 25 according to the density of an image to be printed.

Table 2 shows a relationship between the carriage travel speeds at which printing in each of yellow, magenta and cyan are performed and the carriage travel speeds at which printing in black is performed. In the table, the left column indicates the speeds at which printing in each of yellow, magenta and cyan is performed, while the center column indicates the speed at which printing in black is performed.

TABLE 2

| YMC PRINTING SPEED | BLACK PRINTING SPEED | BLACK PRINTED STATE |
| --- | --- | --- |
| 20CPS | 20 CPS | x |
| \| | 80 CPS | o |
| \| | } | |
| \| | 100 CPS | o |
| \| | 130 CPS | o |
| ↓ | 150 CPS | x |

In the second embodiment, the carriage travel speed at which printing in each of yellow, magenta and cyan is performed is 20 cps each, only the carriage travel speed at which black printing is performed is controlled variably. Table 2 shows the case in which the carriage travel speed for black printing is the same (20 cps) as the other printing and 7.5 times (150 cps) as high. The right column of the table indicates states of a gray or black image by a circle (○) or cross (x) obtained by printing with each ink under the condition shown in that row. The circle indicates that no matting phenomenon has occurred, resulting in good printing, while the cross indicates that a matting phenomenon has occurred, resulting in poor printing.

As seen from Table 2, if the carriage travel speed at which black printing is performed when forming an image by superimposing the inks of the four colors is made equal to the carriage travel speed (namely 20 cps) at which the printing with yellow, magenta and cyan inks is performed, a matting phenomenon is also caused, resulting in poor printing. If the carriage travel speed at which black printing is performed is set to a level 1.5 times (30 cps) as high as the carriage travel speed at which printing of the other colors is performed, a good printing result is obtained.

If the carriage travel speed at which black printing is performed is set to a level 7.5 times (150 cps) as high as the carriage speed at which printing of the other colors is performed, poor ink transfer is caused not by the matting phenomenon but by the excess speed, resulting in a poor gray or black image.

Therefore, in the second embodiment, the same energy as used for printing with each of yellow, magenta and cyan inks is applied to the thermal head when printing with the black ink, while the carriage travel speed at which black printing is performed is set to a level N ($1<N<7.5$) times as high as the speed at which the printing of the other three colors is performed, thereby reducing the energy to be actually applied to the print paper. Thus, the total energy (accumulated energy) obtained by adding the energy for the last black printing to the energy for the preceding three-color printing becomes lower than the energy that will cause a matting phenomenon.

The following describes the operation of the second embodiment.

Image information inputted from a host computer or an image reader, not shown, into the controller 25 of the thermal transfer printer 1 is stored in the RAM 26 as recording data classified by the four colors of yellow, magenta, cyan and black. Actual printing is performed in the order of yellow, magenta, cyan and black by using the ribbon cassettes 5a, 5b, 5c and 5d in this order. It should be noted that a chromatic color is formed by adding a gray scale to one or two of inks of three colors of yellow, magenta and cyan. An achromatic color is formed by adding a gray scale to a combination of inks of three colors of yellow, magenta and cyan. Of achromatic colors, specially high density black, or great black is formed by adding a black ink to the three inks of yellow, magenta and cyan.

Printing in the yellow ink is performed as follows. The cassette ribbon 5a housing the yellow heat-sublimation ink ribbon 17a is detected when the optical sensor 18a arranged on the carriage 4 detects the identification marker 23 of the ribbon cassette 5a while the carriage 4 is being moved from the home position to the right in FIG. 1 by a command given by the controller 25. Then, upon detecting the identification marker, the optical sensor 18a sends a detection signal indicating the identification marker 23 containing the arrangement and pitch of the nonreflective portions 24a to the controller 25. The controller 25 determines whether the detected identification marker 23 is of the ribbon cassette 5a corresponding to the command. If the identification marker 23 is found of the ribbon cassette 5a corresponding to the command, the controller 25 stops the carriage 4; otherwise, the controller 25 continues moving the carriage 4 until the identification marker 23 of the ribbon cassette 5a corresponding to the command is found.

If the desired identification marker 23 is found, the controller 25 stops the carriage 4 at a position opposed to the corresponding ribbon cassette 5a, drives each parallel crank 8 and the rotary crank 11 to raise the upper carriage 4b, and passes the ribbon cassette 5a held in the cassette holder of the canopy 19 and housing the yellow heat-sublimation ink ribbon 17a to the upper carriage 4b. Then, the controller 25 drives each parallel crank 8 and the rotary crank 11 again to lower the upper carriage 4b until the same touches the lower carriage 4a, upon which yellow printing using this ribbon cassette 5a starts. In this yellow printing, the controller 25 controls the amount of the energy to be applied to the thermal head 7 such that the printing is performed according to the density of the image to be printed, moving the carriage 4 at a predetermined travel speed for yellow printing.

When the yellow printing is completed, the controller 25 stops the carriage 4 at a position opposed to the cassette holder that housed the ribbon cassette 5a used in the printing, raises the upper carriage 4b as described above, and passes the yellow ink ribbon cassette 5a mounted on the upper carriage 4b to the cassette holder. Then, the optical sensor 18a detects the identification marker 23 of the magenta ribbon cassette 5b to be used next. The corresponding ribbon cassette 5b is mounted on the carriage 4, upon which magenta printing is performed. In this magenta printing too, the controller 25 controls the amount of the energy to be applied to the thermal head 7 such that the printing is performed according to the density of the image to be printed, moving the carriage 4 at the same travel speed for magenta printing as that at which the above-mentioned yellow printing is performed.

When the magenta printing is completed, the cyan printing is performed in generally the same manner.

Thus, the printing by use of the heat-sublimation inks of yellow, magenta and cyan is performed by moving the carriage 4 at a predetermined speed according to the density of the image to be printed. It should be noted that, in forming an achromatic image such as black or gray, the energies to be applied to the heat-generating elements when printing with each of yellow, magenta and cyan inks are normally made equal to each other.

In the second embodiment, when the printing of the three colors has been completed, the ribbon cassette 5d of a black ink is mounted on the carriage 4 in the same manner as described above. When recording data indicating black printing is outputted from the RAM 26 to the controller 25, the controller 25 increases the travel speed of the carriage 4 N times as high as the travel speed at which the printing of each of the three colors of yellow, magenta and cyan has been performed, while applying the same amount of energy to the heat-generating elements as that applied for printing the three colors.

Thus, while applying the same amount of energy to the heat-generating elements for black printing as that for the printing of the other three colors, the travel speed of the carriage 4 for black printing is made fatter than that for the printing of the other three colors. This can provide the amount of energy in inverse proportion to the travel speed of the carriage 4, reducing the accumulated amount of energy in one dot in the printed image to eliminate a matting phenomenon.

To be more specific, when printing a continuous gray area with a black ink for example, the same amount of energy is applied to the heat-generating elements as that applied for the printing of the other three colors, the carriage travel speed for printing the other three colors is set to 20 cps, and the carriage travel speed for black printing is increased by four times to 100 cps. This setting allows the black printing to be performed with the amount of energy one fifth the amount of energy required for printing with each of yellow, magenta and cyan inks, resulting in good printing as shown in the table.

It should be noted that forming the gray image does not always require the superimposition of a black ink; the application of the energy to the heat-generating elements of the thermal head 7 may be interrupted when the heat-generating elements have come to a portion of printing for which the printing with the black ink is not required.

As described, according to the thermal transfer printer practiced as the second embodiment of the invention, when forming a high-density gray or black image by superimposing the heat-sublimation inks of the four colors, the same amount of energy is applied for the printing of each of colors and the travel speed of the thermal head 7 is made faster when performing the last black printing than that at which the printing of each of the other three colors is performed. This reduces the accumulated amount of energy per dot in the image to be printed below the level that causes a matting phenomenon, resulting in good printing.

It will be apparent that the present invention is not limited to the above-mentioned embodiment and changes and modifications may be made without departing the spirit of the invention. For example, in the second embodiment, when forming a high-density gray or black image by superimposing the heat-sublimation inks of the four colors, the carriage speed for black printing is set to a level five times as high as the speed at which printing of each of the other three colors is performed. It will be apparent that the carriage travel speed for black printing may be any multiple between 1 and 7.5 times as high as the carriage travel speed for printing of each of the other three colors (preferably, $1.5 \leq N \leq 7$ in increments of 0.5). The speed within this range reduces the amount of energy to be applied to the thermal head 7 for black printing to about 15% to 65% of the amount of energy for printing with each of the other three color inks, thereby reducing the accumulated energy on the print paper to eliminate a matting phenomenon as seen from Table 2.

As described and according to the first and second embodiments of the invention, forming an image in full-color printing by superimposing the heat-sublimation inks of four colors will not adversely affect the print paper, resulting in the full-color image of good quality.

The following describes a third preferred embodiment of the invention.

The basic constitution of the third embodiment is generally the same as that of the above-described first embodiment; therefore the description of the basic constitution will be omitted from the following description. The difference lies only in that the ribbon cassette 5d houses the ink ribbon 17d of a black heat-sublimation ink in the first embodiment, while the ribbon cassette 5d houses an ink ribbon 17e of a transparent heat-melt ink in the third embodiment.

The following describes the operation of the third embodiment having the above-mentioned constitution.

In the third embodiment, image information outputted from a host computer or an image reader, not shown, into the controller 25 of the thermal transfer printer 1 of the present embodiment is stored in the RAM 26 as recording data classified by three colors of yellow, magenta and cyan. Actual printing is performed in the order of yellow, magenta, cyan and transparent by using the ribbon cassettes 5a, 5b, 5c and 5d in this order. It should be noted that a chromatic color is formed by adding a gray scale to one or two of inks of the three colors of yellow, magenta and cyan. An achromatic color is formed by adding a gray scale to a combination of inks of the three colors of yellow, magenta and cyan.

As with the first embodiment, the inks are applied in the order of yellow, magenta and cyan for printing. When the printing of these three colors has been completed, recording data indicating a solid image pattern that uses a heat-melt transparent ink is outputted from the RAM 26 of the controller 25. Based on the outputted data, the image printed in yellow, magenta and cyan is overprinted with the transparent ink with the solid image pattern satisfying the maximum vertical and lateral dimensions of that image. In this case, in the third embodiment, a peel-off lever, not shown, for example is disposed on the carriage 4 to delay the peeling off of the ink ribbon and lower the peeling-off force, effecting cold peeling.

Meanwhile, an image having a normal color is formed by superimposing heat-sublimation inks of two colors or less. To obtain a black image or a high-density gray image, the heat-sublimation inks of the three colors of yellow, magenta and cyan need to be superimposed on each other. Further, in the third embodiment, the transparent heat-melt ink is overprinted on the image formed with the three colors.

When forming an image with inks of two colors or less superimposed on each other, applying a large amount of energy to the heat-generating elements of the thermal head 7 for printing will not adversely affect the print paper to ensure printing of good quality. However, if the printing with each of the three colors and then the overprinting with the transparent ink are performed with an equal amount of applied energy, the print paper will be thermally deformed to cause a matting phenomenon such as wrinkle or wave, resulting in poor printing.

Consequently, in the third embodiment, the controller 25 controls the amount of energy to be applied to the heat-generating elements of the thermal head 7 according to the density of the image to be printed.

Table 3 shows a relationship between the energies to be applied to the heat-generating elements and the matting phenomenon in printing in each of the colors in 16 gray scales. The vertical axis indicates the energies to be applied to the heat-generating elements in printing in each of yellow, magenta and cyan, while the horizontal axis indicates the energies to be applied to the heat-generating elements for overprinting with the transparent ink. As the values increase, the energies get higher. These values indicate the relative amounts of energies represented in 16 gray scales. In the table, a circle (○) at the intersection of the vertical and horizontal axes indicates that, at that combination of energies, no matting phenomenon occurs, while a cross (x) indicates combination of energies, a matting phenomenon occurs.

TABLE 3

| | | APPLIED ENERGIES FOR RECORDING YELLOW, MAGENTA AND CYAN INKS | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| APPLIED ENERGIES FOR RECORDING TRANSPARENT INK | 0 | ○ | ○ | ○ | ○ | ○ | ○ | ○ | ○ | ○ | ○ | ○ | X | X | X | X | X |
| | 1 | ○ | ○ | ○ | ○ | ○ | ○ | ○ | ○ | ○ | ○ | ○ | X | X | X | X | X |
| | 2 | ○ | ○ | ○ | ○ | ○ | ○ | ○ | ○ | ○ | ○ | ○ | ○ | ○ | ○ | ○ | ○ |
| | 3 | ○ | ○ | ○ | ○ | ○ | ○ | ○ | ○ | ○ | ○ | ○ | ○ | ○ | ○ | ○ | ○ |
| | 4 | ○ | ○ | ○ | ○ | ○ | ○ | ○ | ○ | ○ | ○ | ○ | ○ | ○ | ○ | ○ | ○ |
| | 5 | ○ | ○ | ○ | ○ | ○ | ○ | ○ | ○ | ○ | ○ | ○ | ○ | ○ | ○ | ○ | ○ |
| | 6 | ○ | ○ | ○ | ○ | ○ | ○ | ○ | ○ | ○ | ○ | ○ | ○ | ○ | ○ | ○ | ○ |
| | 7 | ○ | ○ | ○ | ○ | ○ | ○ | ○ | ○ | ○ | ○ | ○ | ○ | ○ | ○ | ○ | ○ |
| | 8 | ○ | ○ | ○ | ○ | ○ | ○ | ○ | ○ | ○ | ○ | ○ | ○ | ○ | ○ | ○ | ○ |
| | 9 | ○ | ○ | ○ | ○ | ○ | ○ | ○ | ○ | ○ | ○ | ○ | ○ | ○ | ○ | ○ | ○ |
| | 10 | ○ | ○ | ○ | ○ | ○ | ○ | ○ | ○ | ○ | ○ | ○ | ○ | ○ | ○ | ○ | ○ |
| | 11 | ○ | ○ | ○ | ○ | ○ | ○ | ○ | ○ | ○ | ○ | ○ | X | X | X | X | X |
| | 12 | ○ | ○ | ○ | ○ | ○ | ○ | ○ | ○ | ○ | ○ | ○ | X | X | X | X | X |
| | 13 | ○ | ○ | ○ | ○ | ○ | ○ | ○ | ○ | ○ | ○ | ○ | X | X | X | X | X |
| | 14 | ○ | ○ | ○ | ○ | ○ | ○ | ○ | ○ | ○ | ○ | ○ | X | X | X | X | X |
| | 15 | ○ | ○ | ○ | ○ | ○ | ○ | ○ | ○ | ○ | ○ | ○ | X | X | X | X | X |

As seen from Table 3, when forming an image by superimposing the inks of three colors or less, a matting phenomenon occurs if the amount of applied energy in printing in each of yellow, magenta and cyan is 11 or higher. However, even in forming an image by overprinting the transparent ink on the inks of these three colors, if the applied energy in overprinting with the transparent ink is between 2 and 10 inclusive, no matting phenomenon occurs. Also, if the applied energy is 10 or lower in printing in each of yellow, magenta and cyan, no matting phenomenon occurs even if the applied energy in overprinting with the transparent ink is 15, the maximum value.

The reasons are as follows. When the applied energy in overprinting with the transparent ink is between 2 and 10 inclusive, if a matting phenomenon is caused by superimposing the inks of three colors, heating of the paper by the later overprinting of the transparent ink causes a laminate effect, which smoothes the wavy surface of the paper. When the applied energy in printing in each of yellow, magenta and cyan is 10 or lower, the total energy obtained by adding the energies accumulated so far to the applied energy in overprinting with the transparent ink is less than the amount of energy that causes a matting phenomenon.

Therefore, the controller 25 controls the printing with the heat-sublimation inks of yellow, magenta and cyan with any of applied energies up to 15 in Table 3 according to the density of the image to be printed. As for the overprinting with the transparent ink, the controller 25 performs control such that the applied energy falls between 2 and 10 inclusive. It should be noted that, in forming an achromatic image such as black or gray, the energies to be applied to the heat-generating elements when printing with yellow, magenta and cyan inks are normally made equal to each other.

If the energy to be applied to the heat-generating elements in printing with each of yellow, magenta and cyan inks is a low density of 10 or less, addition of the energy for the later superimposition of the transparent ink to the above-mentioned energy does not pose a danger of causing a matting phenomenon. Therefore, the overprinting of the transparent ink can also be performed with the maximum energy of 15.

As described, in the third embodiment, the image printed in yellow, magenta and cyan is overprinted with the transparent ink with the solid image pattern satisfying the maximum vertical and lateral dimensions of that image, so that the image printed with the inks of the three colors can be protected by the overprinting of the transparent ink. Consequently, if the printed paper is left for long, discoloration of the print due to ultraviolet ray or ink peeling-off can be prevented for sure, thereby maintaining good print quality for long.

The amount of energy to be applied to the heat-generating elements of the thermal head 7 when superimposing a transparent ink is less than the amount of energy to be applied when printing with the inks of the three colors. Consequently, if a matting phenomenon is caused by the energy applied to the heat-generating elements in printing with each of yellow, magenta and cyan inks, resulting in a wavy surface of the paper, the laminate effect caused by heating the paper in overprinting the transparent ink smoothes the surface of the paper for printing of good quality.

While the preferred embodiments of the present invention have been described using specific terms, such description is for illustrative purposes only, and it is to be understood that changes and variations may be made without departing from the spirit or scope of the appended claims.

What is claimed is:

1. A thermal transfer recording method of recording a color image, comprising:

providing a thermal head comprising a plurality of heat generating elements being selectively energized;

providing a controller to selectively energize and to control an amount of energy applied to the heat generating elements;

providing ink films containing yellow heat-sublimation ink, magenta heat-sublimation ink, cyan heat-sublimation ink and transparent heat-melt ink;

providing a sheet of paper;

determining a first amount of energy to be applied for different densities of yellow, magenta and cyan heat-sublimation inks, including determining ranges of the first amount of energy where a matting phenomenon will occur;

determining a second amount of energy to be applied for different densities of transparent heat-melt ink, including ranges of the second amount of energy where the matting phenomenon will occur;

mapping the first and second energies to be applied;

applying the first amount of energy to the heat generating elements to transfer the yellow heat-sublimation ink, magenta heat-sublimation ink, and cyan heat-sublimation ink to the sheet of paper;

applying the second amount of energy to the heat generating elements to transfer the transparent heat-melt ink to the sheet of paper; and controlling the first amount of energy and the second amount of energy from the mapping so that the second amount of energy falls within a range wherein the matting phenomenon does not occur.

2. A thermal transfer printer for recording a color image, comprising:

ink films containing yellow heat-sublimation ink, magenta heat-sublimation ink, cyan heat-sublimation ink and transparent heat-melt ink;

a sheet of paper;

a thermal head comprising a plurality of heat generating elements being selectively energized;

a controller to selectively energize and to control an amount of energy applied to the heat generating elements by determining a first amount of energy to be applied for different densities of yellow, magenta and cyan heat-sublimation inks, including determining ranges of the first amount of energy where a matting phenomenon will occur;

determine a second amount of energy to be applied for different densities of transparent heat-melt ink, including ranges of the second amount of energy where the matting phenomenon will occur;

map the first and second energies to be applied;

apply the first amount of energy to the heat generating elements to transfer the yellow heat-sublimation ink, magenta heat-sublimation ink, and cyan heat-sublimation ink to the sheet of paper;

apply the second amount of energy to the heat generating elements to transfer the transparent heat-melt ink to the sheet of paper; and control the first amount of energy and the second amount of energy from the mapping so that the second amount of energy falls within a range wherein the matting phenomenon does not occur.

3. A thermal transfer printer for recording a color image with heat-sublimation inks of three colors of yellow, magenta and cyan and for transferring transparent heat-melt ink onto an upper surface of the color image, comprising:

a thermal head mounted on a carriage, the thermal head selectively driven while the carriage reciprocates along a platen and being selectively energized;

control means for controlling an energy applied per dot within a predetermined amount for the transparent heat-melt ink when a concentration of the color image recorded with the heat-sublimation inks of three colors is more than a predetermined concentration.

4. The thermal transfer printer of claim 3, wherein the control means applies a predetermined amount of energy to heat generating elements on the thermal heads during transfer of the transparent heat-melt ink when a total amount of energy applied to the heat generating elements in the thermal head exceeds a predetermined value during recording of the color image with application of the heat-sublimation inks of three colors.

5. A thermal transfer printer of claim 3, wherein the control means performs a controlling operation so that a moving speed of the carriage during transfer of the transparent heat-melt ink becomes faster within a predetermined range than a moving speed of the carriage during recording of the color image with the heat-sublimation inks of three colors when a total amount of energy applied to the heat generating elements in the thermal head exceed a predetermined value during recording of the color image with application of the heat-sublimation inks of three colors.

6. The thermal transfer printer of claim 5, wherein the moving speed of the carriage during transfer of the transparent heat-melt ink is controlled within a range of 1.5 to 7 times of the moving speed of the carriage during the recording of the color image with the heat-sublimation inks of three colors.

7. The thermal transfer printer of claim 6, wherein when the transparent heat-melt ink is transferred, the control means controls the heat generating elements in such a way that the transparent heat-melt ink is transferred in a fill-pattern within a range satisfying lateral and vertical maximum values of the color image recorded by the three colors of heat-sublimation inks.

* * * * *

UNITED STATES PATENT AND TRADEMARK OFFICE
CERTIFICATE OF CORRECTION

PATENT NO. : 6,064,414
DATED : May 16, 2000
INVENTOR(S) : Hiroshi Kobayashi et al.

It is certified that error appears in the above-identified patent and that said Letters Patent is hereby corrected as shown below:

Title page,
Column 2,
Line 1, under "FOREIGN PATENT DOCUMENTS", change "European Pat. Off." to -- Germany --.

Claims,
Claim 1,
Line 16, change "will occur" to -- occurs --.
Line 20, change "will occur" to -- occurs --.

Claim 2,
Line 15, change "will occur" to -- occurs --.
Line 19, change "will occur" to -- occurs --.

Claim 7,
Lines 4-5, change "fill-pattern" to -- fill-pattern --.

Signed and Sealed this

Twenty-third Day of October, 2001

Attest:

*Nicholas P. Godici*

NICHOLAS P. GODICI
*Acting Director of the United States Patent and Trademark Office*

*Attesting Officer*